United States Patent [19]

Fiedler

[11] Patent Number: 4,617,802
[45] Date of Patent: Oct. 21, 1986

[54] FREEZER APPARATUS

[75] Inventor: Armin Fiedler, Chicago, Ill.

[73] Assignee: International Freezer Corporation, Chicago, Ill.

[21] Appl. No.: 724,659

[22] Filed: Apr. 18, 1985

[51] Int. Cl.$^4$ .................................... A23G 9/20
[52] U.S. Cl. ...................... 62/125; 62/308; 62/342; 73/317; 137/398; 137/433; 137/448; 137/558; 222/51; 366/152
[58] Field of Search ............ 62/307, 308, 125, 342, 62/343; 137/398, 448, 433, 558, 208; 222/66, 67, 51; 366/152; 73/314, 317; 116/228, 229; 340/625

[56] References Cited

U.S. PATENT DOCUMENTS

| | | | |
|---|---|---|---|
| 843,069 | 2/1907 | Burdick | 137/433 |
| 1,993,130 | 3/1935 | Ballew | 62/307 |
| 2,133,962 | 10/1938 | Shoemaker | 137/448 X |
| 3,018,641 | 1/1962 | Carpigiani | 62/342 |
| 3,019,615 | 2/1962 | Moser | 62/342 X |
| 3,317,198 | 5/1967 | Phelan et al. | 62/342 X |
| 3,898,858 | 8/1975 | Erickson | 62/342 X |
| 4,052,180 | 10/1977 | Erickson | 62/342 |
| 4,144,757 | 3/1979 | Mauboussin | 340/625 X |
| 4,412,428 | 11/1983 | Giannella et al. | 62/308 |
| 4,483,367 | 11/1984 | Ross, Jr. et al. | 137/558 X |

Primary Examiner—William E. Tapolcai

Attorney, Agent, or Firm—Mason, Kolehmainen, Rathburn & Wyss

[57] ABSTRACT

New and unexpected control is achieved over the ratio of food ice mix/air directed from a food ice mix container to a freezer chamber. A one-way float valve is disposed within the channel between the food mix container and the freezer chamber. Float valve apparatus is operative within the food mix container capable of automatically adjusting the size of a food mix port or aperture extending in fluid communication with the freezer chamber so that as the level of food mix in the food mix container becomes lower, the size of the food mix port becomes larger to maintain a constant flow rate of food ice mix from the food mix container into the freezer chamber. Level indicating apparatus is operatively associated with the float including a vertically movable elongated member extending above a cover on the food mix container such that when the level of the food ice mix drops, the elongated level indicator similarly drops. An air content adjusting member extends downwardly into the freezer chamber operatively connected or integral with a channel extending between the food mix container and the freezer chamber for adjusting the uppermost point of fluid communication between the freezer chamber and the channel, thereby adjusting the ratio of food ice mix to air held in the freezer chamber.

46 Claims, 7 Drawing Figures

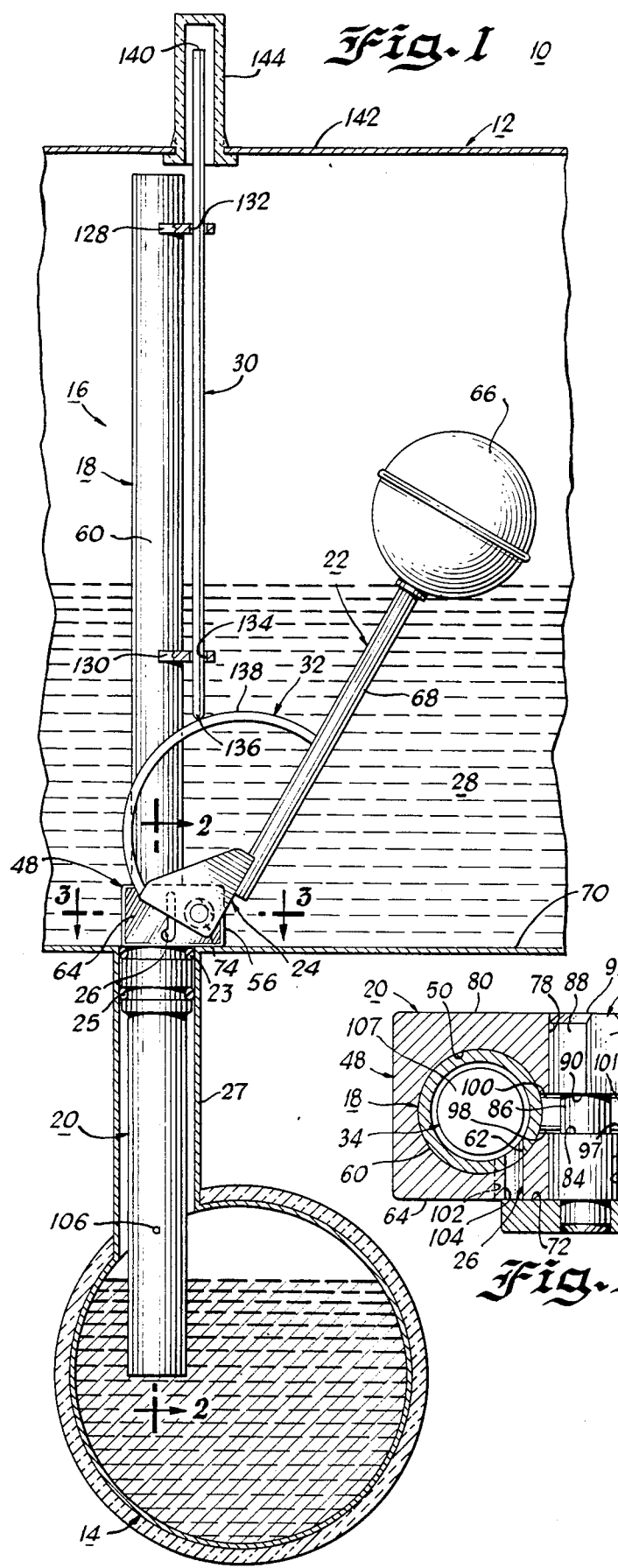
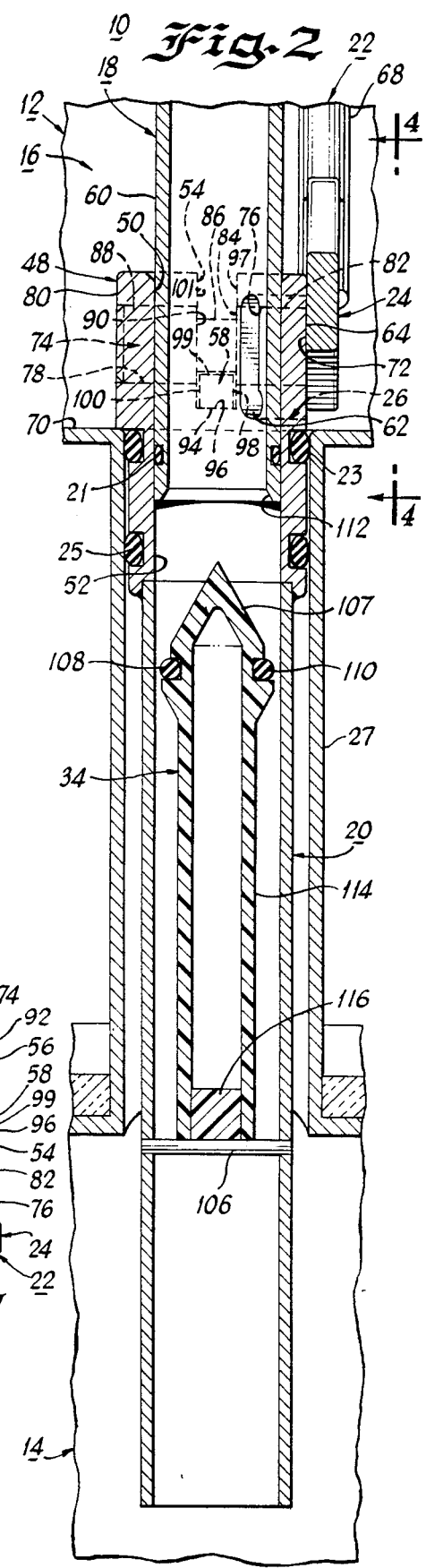

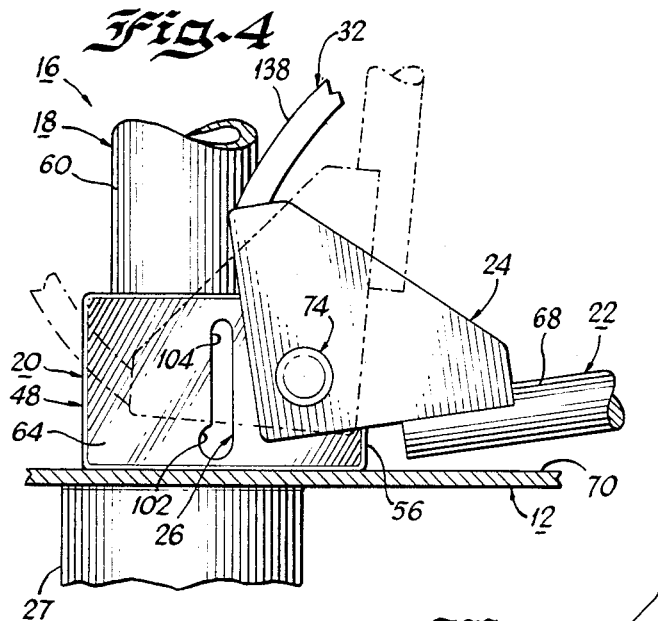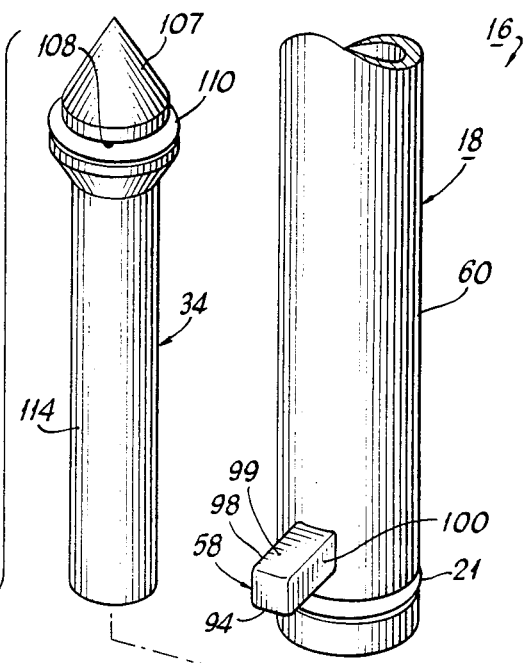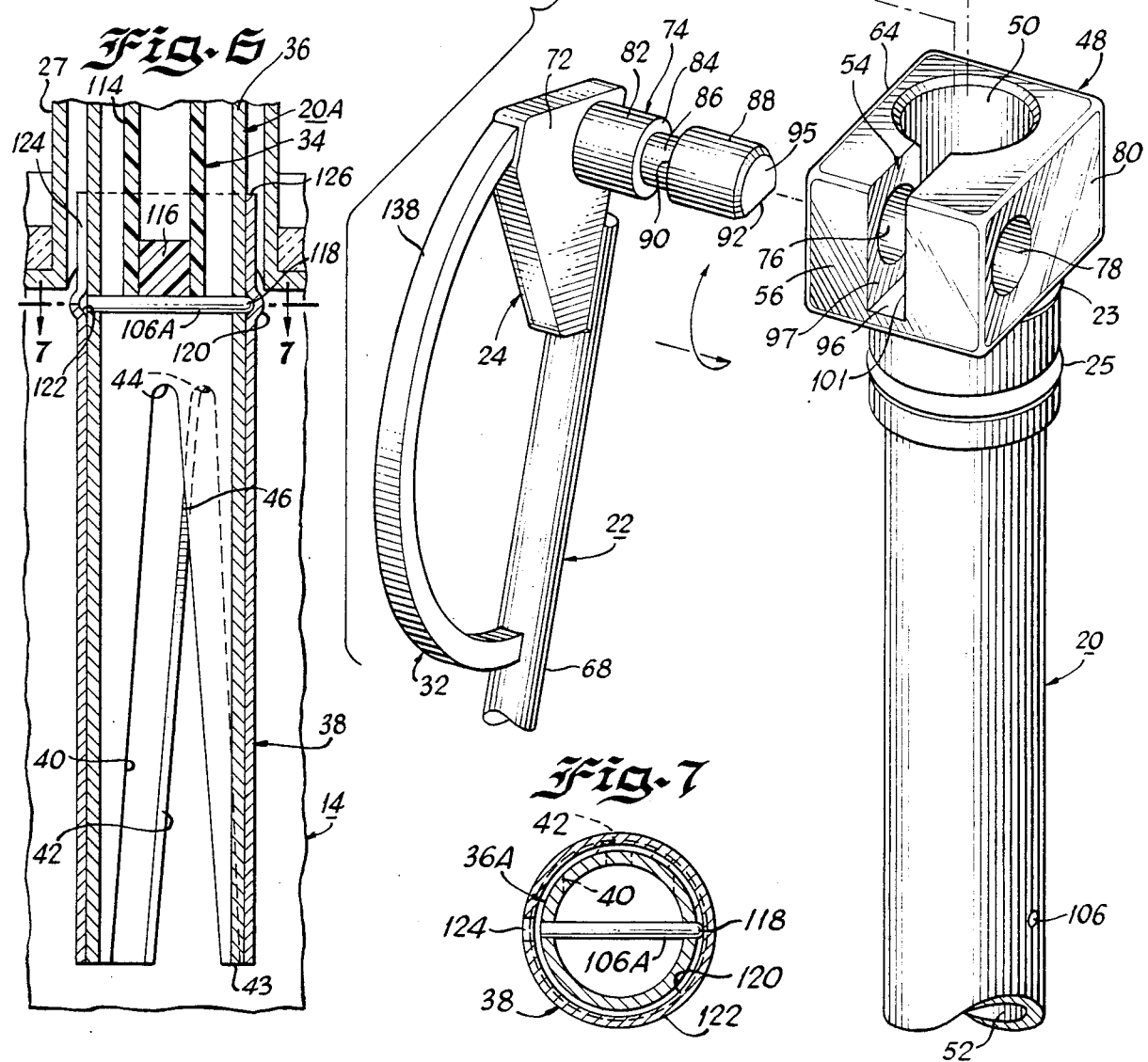

FREEZER APPARATUS

FIELD OF THE INVENTION

The present invention is directed to freezer apparatus and, more particularly, apparatus for dispensing ice cream or other food ice materials.

BACKGROUND OF THE INVENTION AND PRIOR ART

One of the problems associated with food ice, e.g., ice cream, freezing apparatus is in providing a constant, predetermined ratio of food ice mix to air held within the freezer chamber. A number of patents disclose various, somewhat complicated, apparatus for controlling the ratio of materials discharged from a food ice reservoir into a freezing chamber in an attempt to obtain a constant flow and/or ratio of materials into the freezer chamber independent of liquid level in the food ice reservoir. Examples of such patents include the following: U.S. Pat. Nos. 2,132,364; 2,740,264; 3,019,615; and 3,256,100. In the Moser U.S. Pat. No. 3,019,615, a float controlled valve operates a valve member to vary the size of a food mix port leading from the food mix reservoir to the freezer chamber in an attempt to assure constant flow of mix into the freezer chamber despite different pressures due to different liquid levels in the food mix reservoir. The Thompson U.S. Pat. No 2,132,364, Thompson Jr. Pat. No. 2,740,264 and the Burnstein et al U.S. Pat. No. 3,256,100 disclose freezer apparatus having a float valve to provide a constant liquid level in a subsidiary reservoir by controlling flow from a main reservoir.

While the above patents each address the problem of delivering to the freezer chamber a constant flow of food ice mix and a constant ratio of food ice mix to air, the apparatus is somewhat complicated and not conducive to ice cream freezer apparatus which must be frequently cleaned and sterilized, and cannot hold the desired ratio in the freezer chamber.

The following patents have addressed the problem of attempting to obtain a constant ratio of food ice mix to air by providing various valves between the food mix reservoir and the freezer chamber at the inlet to the freezer chamber supply conduit. The Brown et al U.S. Pat. No. 3,030,976 discloses that different orifice sizes are required for mixes of different viscosities. The Vasby U.S. Pat. No. 2,972,239 and the Lutz et al U.S. Pat. No. 3,183,681 each disclose valves at the inlet of the freezer chamber in an attempt to supply a constant ratio of food ice mix to air. The Vasby U.S. Pat. No. 2,972,239 discloses a rotatable, threaded valve member; the Brown et al Pat. No. 3,030,976 discloses one or more reversible plug devices; and the Lutz et al U.S. Pat. No. 3,183,681 discloses a closure member on a spring rod alignable with nozzles.

Prior art patents disclose a recognized relationship between freezer air content and the inlet level on the supply conduit extending into the freezer chamber; see for example the Phelan U.S. Pat. No. 2,947,155 and the Lutz et al U.S. Pat. No. 3,222,035. As disclosed in the Phelan U.S. Pat. No. 2,947,155, the inlet within the freezer chamber should be located at a vertical disposition to achieve a desired air content. The Lutz et al U.S. Pat. No. 3,222,035 discloses more generally the effect of trapped air in the freezer chamber. Neither patent, however, discloses any apparatus for adjusting the level of the inlet tube within the freezer chamber for varying the air content held therein. The Moser U.S. Pat. No. 3,019,615 does not recognize the desirability of varying air content held within the freezer chamber by adjustment of supply tube height within the freezer chamber but appears to disclose an O-ring and sleeve arrangement which may be capable of vertical adjustment.

SUMMARY OF THE INVENTION

The present invention is directed to a number of improvements over the ice cream freezing apparatus of the prior art. Generally, the improvements are directed to providing new and unexpected control over the ratio of food ice mix/air from a food ice mix container held and maintained within a freezer chamber. The improvements include a one-way float valve disposed within the channel between the food mix container and the freezer chamber; float valve apparatus operative within the food mix container capable of automatically adjusting the size of a food mix inlet port or aperture extending in fluid communication with the freezer chamber so that as the level of food mix in the food mix container becomes lower, the size of the food mix port becomes larger to maintain a constant flow rate of food ice mix from the food mix container into the freezer chamber; level indicating apparatus operatively associated with the float including a vertically movable elongated member extending above a cover on the food mix container such that when the level of the food ice mix drops, the elongated level indicator proportionately drops; and an air content adjusting member extending downwardly into the freezer chamber operatively connected or integral with a channel extending between the food mix container and the freezer chamber for adjusting the uppermost point of fluid communication within the freezer chamber between the freezer chamber and the food ice mix container, thereby adjusting the ratio of food ice mix to air maintained within the freezer chamber.

Each of the above outlined improvements is directed generally to inventions in freezer apparatus for dispensing ice cream or other food ice materials. The apparatus includes a food mix container supported above the freezer chamber for retaining a diminishing quantity and level of food ice mix and a freezer chamber operable to dispense frozen or partially frozen food materials to a consumer. A channel provides fluid connection between the food mix container and the freezer chamber and includes an open upper end extending above a food ice mix level in the food mix container and an open lower level extending below a level of food ice mix in the freezer chamber to direct a mixture of air and food ice mix through the channel from the food mix container into the freezer chamber. The air and food ice mix flows into the freezer chamber automatically in replacement amounts when food ice mix is dispensed to the consumer from the freezer chamber as a result of pressure balancing between the food mix container and the freezer chamber.

Accordingly, an object of the present invention is to provide new and improved freezer apparatus for dispensing ice cream or other food ice materials.

Another object of the present invention is to provide new and improved food ice mix freezer apparatus capable of delivering a constant flow of food ice mix from a food ice mix container to a freezer chamber independent of a level of food ice mix within the food ice mix container.

Still another object of the present invention is to provide a new and improved freezer apparatus having a channel for directing food ice mix from a food ice container to a freezer chamber and a pivotally connected float valve having a pivot pin constructed so that pivotal disconnection of the float valve is possible only after vertical movement of the channel out of its operative position.

A further object of the present invention is to provide new and improved freezer apparatus including a valve capable of preventing back flow of food ice mix and air from a freezer chamber to a food mix container.

Still another object of the present invention is to provide new and improved freezer apparatus having a buoyant float valve disposed within a channel in fluid connection between a food mix container and a freezer chamber capable of seating against a valve seat within the channel when food ice mix is not flowing from the food mix container to the freezer chamber and capable of releasing from the valve seat during flow of food ice mix and air into the freezer chamber.

Another object of the present invention is to provide new and improved freezer apparatus including apparatus for adjusting a ratio of food ice mix to air held within a freezer chamber.

Still another object of the present invention is to provide new and iproved freezer apparatus including a channel in fluid communication between the freezer chamber and a food ice mix container and means for adjusting an uppermost point of fluid communication in the channel portion within the freezer chamber between the freezer chamber and the food mix container.

A further object of the present invention is to provide new and improved freezer apparatus including a level-indicating member vertically moveable within a food mix container for indicating a level of food ice mix within the food mix container.

A still further object of the present invention is to provide new and improved freezer apparatus including a float assembly disposed within a food ice mix container including an arcuate cam arm operatively associated with an elongated level-indicating member so that the level-indicating member and float are lowered together with the level of food ice mix in the container.

The above and other objects and advantages of the present invention will become apparent from the following detailed description of the preferred embodiments of the invention taken in conjunction with the drawings.

BRIEF DESCRIPTION OF THE DRAWINGS

FIG. 1 is a partially broken-away, partially elevated, cross-sectional view of one embodiment of the apparatus of the present invention;

FIG. 2 is an enlarged partially broken-away, partially elevated, cross-sectional view taken through the line 2—2 of FIG. 1;

FIG. 3 is an enlarged partially broken-away, partially elevated, cross-sectional view taken through the line 3—3 of FIG. 1;

FIG. 4 is an enlarged partially broken-away, partially elevated, cross-sectional view taken through the line 4—4 of FIG. 2 showing a food mix port-sealing plate in a position wherein the food mix container is full in broken lines and in a fully open position (food mix container empty) in solid lines;

FIG. 5 is an enlarged partially broken-away, exploded view of the apparatus of the present invention;

FIG. 6 is an enlarged partially broken-away, cross-sectional view of an alternate embodiment of the channel portion of the apparatus of the present invention extending into the freezer chamber;

FIG. 7 is an enlarged cross-sectional view of a portion of the apparatus of the present invention taken through the line 7—7 of FIG. 6.

DETAILED DESCRIPTION OF THE PREFERRED EMBODIMENT

Turning now to the drawings, and initially to FIG. 1, there is illustrated new and improved freezer apparatus generally designated by reference numeral 10. The freezer apparatus 10 includes an ice cream or other food mix reservoir, generally designated 12; a freezer chamber generally designated 14; and a channel or conduit generally designated 16 providing fluid connection between the food mix reservoir 12 and the freezer chamber 14. The channel or conduit 16 includes a mixing conduit, generally designated 18, disposed within the food mix reservoir 12 in sealed connection with a freezer chamber delivery or feed conduit, generally designated 20. The mixing conduit 18 and freezer chamber feed conduit 20 are sealed by mixing conduit elastomeric O-ring 21 and feed conduit elastomeric O-rings and 23 and 25 (FIG. 2). The freezer chamber feed conduit 20 extends from the food mix reservoir 12 through connecting sleeve 27 into the freezer chamber 14. The mixing conduit 18 has an outer diameter fitting within an inner diameter of the freezer chamber feed conduit 20 (FIG. 2).

In accordance with an important feature of the present invention, a float valve, generally designated 22, including an integral port-sealing plate, generally designated 24, is operatively associated with a port or aperture, generally designated 26, in the mixing conduit 18 for automatically controlling the rate of flow of food ice mix 28 from the food mix reservoir 12 into the freezer chamber feed conduit 20 and the freezer chamber 14. In accordance with an important embodiment of the present invention, an elongated level-indicating post, generally designated 30, is operatively associated with a cam arm, generally designated 32, integral with the float valve 22 to provide a visible indication of the level of food ice mix within the food mix reservoir 12. In accordance with another important feature of the present invention, a food mix-bouyant conduit sealing valve, generally designated 34, (FIG. 2) is vertically movable within the freezer delivery conduit 20 as a shut-off valve between the mixing conduit 18 and the freezer chamber feed conduit 20 to prevent reverse flow of food ice mix and air from the freezer chamber 14 back into the mixing conduit 18 and food mix reservoir 12.

In accordance with another embodiment of the present invention, shown in FIGS. 6 and 7, a freezer chamber delivery or feed conduit, generally designated 20A, comprises an inner tubular conduit, generally designated 36, and a concentrically mounted outer tubular conduit, generally designated 38, sealingly and rotatably mounted concentrically around inner conduit 36. The inner and outer conduits 36 and 38 both include identically formed inverted V-shaped ports or apertures 40 and 42, respectively, so that by manual rotation of the outer conduit 38 with respect to inner conduit 36, the ports or apertures 40 and 42 can be aligned as desired to provide a predetermined highest point of fluid communication between the two conduits, 36 and 38. Any extent of alignment of the apertures 40 and 42 raises the highest point of fluid communication between the two conduits 36 and 38 from a lowermost edge 43 of the conduits to some intermediate point, or to an apex 44 of the inverted V-shaped ports. For example, the ports or apertures 40 and 42 can be aligned in complete registry to provide an uppermost point of fluid communication between the two conduits 36 and 38 within the freezer chamber 14 at the uppermost points or apexes 44 of the ports or apertures 40 and 42. Similarly, the outer conduit 38 can be rotated with respect to inner conduit 36 to provide some lower, uppermost point of fluid communication from the freezer chamber 14 into the freezer chamber feed conduit 20A, as shown at 46 in FIG. 6. In this manner, the food ice mix/air ratio held within the freezer chamber 14 can be set to a predetermined figure. For example, the air contact normally is adjusted, for ice cream, to a value of about 55 to 60% by volume. An increase of 1° F. in freezer chamber temperature, however, adds about 5% by volume air to the delivered product. By lowering the uppermost point, e.g. 46 in FIG. 6, of fluid communication between the freezer chamber 14 and the freezer chamber feed conduit 20A, temperature variations in the freezer chamber 14 can be compensated for while achieving a desired, predetermined air content or overrun, thereby achieving a more uniform product.

In accordance with another important feature of the present invention, as best shown in FIGS. 1, 4 and 5, an upper end of the freezer delivery or feed conduit 20 is formed of an integral mixing conduit-receiving rectangular block, generally designated 48, disposed to lie within the food mix reservoir 12. The block 48 includes an annular aperture 50 concentric and coextensive in diameter with an inner surface 52 of the freezer delivery or feed conduit 20. The integral block 48 includes a vertical slot 54 extending from an end wall 56 of the block 48 through the block 48 and extending into the aperture 50 (FIG. 5). The slot 54 receives an integral transverse alignment post 58 radially extending from an outer surface 60 of the mixing conduit 18. The alignment post 58 assures proper alignment of a food ice mix-receiving port or aperture 62 in the mixing conduit 18 with the food mix inlet port 26 for passage of food mix through port 26 in the block 48, and through port 62 in the mixing tube 18 for delivery through the feed tube 20 into the freezer chamber 14.

In accordance with another important feature of the present invention, as best shown in FIGS. 1 and 4, the port or aperture 26 is formed in a planar side wall 64 of block 48 to provide a planar surface 64 surrounding the port or aperture 26. The planar wall 64 in block 48 surrounding port 26 is important for sealing a predetermined portion of the inlet port 26 with the port-sealing plate 24 of the float valve 22 to maintain a constant flow of food ice mix through the port 26 into freezer chamber 14, as will be explained in more detail hereinafter.

The float valve 22 (FIGS. 1, 4 and 5) includes a bouyant, sealed hollow ball 66 integral or in operative connection with an elongated float arm 68 extending downwardly toward a floor 70 of the food ice mix reservoir 12. The port-sealing plate 24 of the float valve 22 is integrally mounted to a lower portion or end of the float arm 68 and, in accordance with an important feature of the present invention, includes a planar rearward port-sealing surface 72 pivotally mounted in sealing contact against the planar sidewall 64 of the block 48, as best shown in FIGS. 1, 2, 4 and 5. As best shown in FIG. 5, a pivot pin, generally designated 74 is formed integrally with the port-sealing plate 24 and extends perpendicularly from the port-sealing surface 72. The pivot pin 74 is pivotally mounted within annular pivot pin-receiving apertures 76 and 78 extending completely through the rectangular block 48 from side wall 64 to an opposite sidewall 80 for pivotable movement within the aperture 76 and 78.

In accordance with an important feature of the present invention, the pivot pin 74 includes an annular portion, generally designated 82, integral with the sealing surface 72 of the port-sealing plate 24, having an annular vertical end wall 84 adjacent an intermediate, concentric reduced diameter pivot pin portion 86. The annular vertical wall 84 joins the pivot pin portion 82 to the pivot pin portion 86. The pivot pin portion 86 extends outwardly and concentrically with a concentric, generally annular end pivot pin portion 88 having an innermost annular vertical wall 90 and a flattened planar surface 92 extending from the vertical wall 90 to an end wall 95. This construction of the pivot pin 74 assures sealing contact of the port-sealing surface 72 of plate 24 against the planar side wall 64 of block 48, as hereinafter described.

The transverse alignment post 58 extending radially from the mixing conduit 18 includes a planar lower surface or wall 94 adapted to seat upon a planar lower surface 96 of slot 54 in block 48 between two vertical interior walls 97 and 101 of block 48, defining the slot by walls 97, 101 and 96. The lower surface 94 of alignment post 58 seats upon lower slot surface 96 by lowering the mixing conduit 18, manually, within the aperture 50 of rectangular block 48. The alignment post 58 includes two side walls 98 and 100, spaced a distance slightly less (e.g., 0.001 to 0.002 inch) than the length of reduced-diameter pivot pin portion 86. An upper surface 99 of the post 58 lies directly beneath the reduced-diameter intermediate portion 86 of the pivot pin 74. In this way, the side walls 98 and 100 of alignment post 58 form pivot pin guide walls for pivotal contact with vertical walls 84 and 90 at the ends of the reduced-diameter pivot pin portion 86 to prevent longitudinal movement of the pivot pin 74 within the apertures or slots 76 and 78 of the block 48. Further, as shown in FIG. 2, the upper surface 99 of the post 58 extends upwardly to interfere with a lower portion of the aligned slots 74 and 76 so that the flattened surface 92 of the outermost pivot pin portion 88 must be properly aligned with the upper post surface 99 (see FIG. 5) to initially attach the outermost pivot pin portion 88 within slot 76. The pivot pin 74 maintains the mixing conduit 18 sealingly seated within the freezer chamber feed conduit 20 and maintains the planar port-sealing surface 72 of plate 24 in sealing contact against the planar side wall 64 of block 48 to maintain proper sealing of the port-sealing surface 72 of plate 24 over a predetermined portion of the port 26.

As shown in FIG. 5, the alignment of flattened surface 92 with the upper surface of post 58 is achieved, when the freezer chamber feed conduit 20 is vertical, with the float valve 22 in a position below horizontal so that the float valve 22 must be initially attached to the freezer chamber feed conduit 20 outside of its operative position in sleeve 27 and, therefore, the float 22 cannot be detached with the freezer chamber feed conduit 20 in operative position.

To achieve the full advantage of the present invention, the food ice mix inlet port 26 in the planar wall 64 of block 48 includes a generally annular lower portion 102 interconnected to an elongated generally vertical, generally rectangular upper port portion 104. Pivotal movement of the port-sealing plate 24 causes the port-sealing surface 72 to sealingly engage more or less of the elongated portion 104 of the port 26, as illustrated in FIG. 4. As described, the port-sealing plate 24 is connected to the float 22 through the elongated float arm 68 so that the effective opening of the port 26 is governed by the position of the float 22. In this manner, a lower level of food ice mix within the food ice reservoir 12 provides a greater effective port opening, and a higher level of food ice mix within the food ice mix reservoir 12 provides a lesser effective port opening to maintain constant flow of food ice mix through the port 26. A greater height of the food ice mix within the food ice reservoir 12 creates a greater pressure of the mix on the port 26 so that a smaller effective port opening is needed to maintain the same flow as that resulting from a lower height of food ice mix flowing through a larger effective port opening.

In accordance with still another important feature of the present invention, the buoyant conduit-sealing valve 34 (FIG. 2) is disposed within the freezer delivery or feed conduit 20 and retained therein by a transverse retaining pin 106 centrally disposed within and spanning the freezer feed conduit 20. The buoyant conduit-sealing valve 34 is hollow, and formed of a suitable lightweight material, such as a plastic e.g., polypropylene or polyethylene, sealed so that the valve 34 will float in the ice cream or other food ice mix being delivered through the freezer feed conduit 20, except during flow of food ice mix and air through the freezer feed conduit 20.

The sealing valve 34 includes an inverted cone-shaped upper surface 107 adapted to be received in a lower portion of the mixing conduit 18. A slot or groove 108 is disposed below the cone-shaped surface 106 for receiving an elastomeric O-ring 110 disposed to seat against an outwardly flared annular surface 112 in an open lower end of the mixing conduit 18. The sealing of the O-ring 110 within the mixing conduit 18 prevents back flow of food ice mix and air from the freezer chamber 14 into the mixing conduit 18, port or aperture 26 and food ice mix reservoir 12. The sealing valve 34 includes a reduced diameter shank portion 114 sealed at its lowermost end with plug 116. The food ice mix and air flows relatively fast around the sealing valve 34 in the vicinity of the O-ring 110 and a dramatic slowing of the flow of food ice mix and air around the shank portion 114 provides better and continued mixing of the food ice mix with air through the freezer or feed conduit 20 into the freezer chamber 14.

When food ice material is discharged from the freezer chamber to the consumer, food ice mix from the food ice reservoir 12 and air from the mixing conduit 18 flow into the freezer delivery or feed conduit 20 forcing the buoyant conduit-sealing valve 34 downwardly against the retaining pin 106 to permit the food ice mix and air to flow around the valve 34, as described above, into the freezer chamber 14 in replacement amounts until the pressures are balanced between the food ice mix reservoir 12 and the freezer chamber 14. At this time, food ice mix and air within the freezer delivery or feed conduit 20 force the buoyant conduit-sealing valve 34 to rise by flotation on the food ice material causing the O-ring 110 of the valve 34 to seat against the outwardly flared annular surface 112 at the bottom open end of the mixing conduit 18 to prevent food ice mix and air from rising upwardly through the mixing conduit 18, thereby maintaining a constant ratio of food ice mix and air within the freezer chamber 14. Without the valve 34, much of the air and some of the food ice mix would back flow out of the freezer chamber 14.

The two-piece freezer feed conduit 20A embodiment shown in FIGS. 6 and 7 includes an elongated retaining pin 106A extending at one end 118 beyond an outer surface of the inner conduit 36 of freezer feed conduit 20A. The outer concentric conduit 38 includes an outwardly flared portion 120 providing an inner concave, pin-receiving slot 122 on an inner surface of conduit portion 36 for longitudinally securing the outer conduit portion 38 against the inner conduit portion 36 of the freezer feed conduit 20A. The outer conduit portion 38 includes a longitudinal slot 124 (FIG. 7) extending from an upper surface 126 of the outer conduit 38 to a point immediately below the flared portion 120 for initially positioning the outer conduit 38 over the inner conduit 36 and over the outwardly extending end 118 of retaining pin 106A. After initial positioning, the outer conduit 38 can be rotated with respect to inner conduit 36 with the extending end 118 of the retaining pin 106A maintaining a constant longitudinal disposition between the outer conduit 38 and the inner conduit 36.

The food ice mix entering the freezer conduit 20A through port or aperture 26 and air entering freezer conduit 20A from the top of the mixing conduit 18 enter the freezer chamber 14 until air collects above the food ice mix, as shown in FIG. 1, to balance the pressures between the food mix reservoir 12 and the freezer chamber 14. A typical agitator having scraper blades (not shown) then turns within the freezer chamber in a counterclockwise direction, as the freezer chamber is shown in FIG. 1, to maintain a homogeneous, consistent food ice mix-air product filling the freezer chamber 14 and maintaining the sealing valve 34 in sealed position to prevent air or food ice mix from escaping from the freezer chamber 14. The sealing valve 34 maintains a full freezer chamber 14 and prevents escape of materials to hold a predetermined food ice mix/air ratio within the freezer chamber 14. The outer conduit 38 can be turned to provide a desired upppermost level of fluid communication between the food mix reservoir and the freezer chamber 14, as described, to vary the food ice mix/air ratio held in the freezer chamber 14 to a predetermined value.

In accordance with another important feature of the present invention, the food ice mix reservoir 12 includes the elongated level-indicating post 30 mounted for vertical movement within a pair of guide eyes 128 and 130. The guide eyes 128 and 130 are secured to the mixing conduit 18 and have enlarged post-receiving openings 132 and 134, respectively, for loosely retaining the level-indicating post 30 therein. A lowermost end 136 of the level indicating post 30 maintains constant contact against an upper surface 138 of the cam arm 32 of float valve 22. An upper end 140 of the level-indicating post 30 extends above an upper wall or cover 142 of the food ice mix reservoir 12 and within a transparent sight glass 144 mounted on the cover 142 of the food ice reservoir 12, as shown in FIG. 1. The sight glass 144 can contain level indicating markings (not shown) indicating the relative quantity of food ice mix contained within the reservoir 12 corresponding with the uppermost end 140 of the level-indicating post 30.

As shown in FIGS. 1 and 5, the upper surface 138 of the cam arm 32 of float valve 22 is generally arcuate to achieve smooth vertical movement upwardly and downwardly of the level-indicating post 30 as the level of food ice mix within the reservoir 12 descends, or rises upon filling. Further, the cam arm 32 of the float valve 22 is disposed such that when the float valve 22 is in its lowermost position, as shown in solid lines in FIG. 4, the upper surface 138 of cam arm 32 maintains contact with the lowermost end 136 of the level-indicating post 30 so that re-filling of the food ice mix reservoir 12 will provide automatic raising of the level-indicating post 30 without the necessity for manually raising the post 30 to the position shown in FIG. 1.

What is claimed and desired to be secured by Letters Patent is:

1. Freezer apparatus for dispensing ice cream or other food ice materials comprising a food mix container supported above a freezer chamber for retaining a level of food mix; a freezer chamber operable to dispense frozen or partially frozen food materials to a consumer; channel means for providing a fluid connection between the food mix container and the freezer chamber, said channel means having an open lower end extending below a level of food mix in the freezer chamber and including a planar exterior surface surrounding a food mix inlet port portion from the planar surface extending to within the channel and defined by walls of the planar surface, said inlet port disposed within a lower portion of the food mix container for admitting a predetermined constant flow rate of food mix from said food mix container through said port and into the freezer chamber, said channel means including an open upper end extending above a level of food mix in the food mix container for receiving air from above the food mix and directing said air, together with said food mix flowing through said port, into the freezer chamber, said air and food mix flowing into the freezer chamber automatically, in replacement amounts, when food mix is dispensed to said consumer from the freezer chamber, as a result of pressure balancing between the food mix container and the freezer chamber; a float means disposed within the food mix container including a buoyant float member adapted to extend above an upper surface of the food mix within the food mix container and an integral elongated float arm extending downwardly from the float member within the food mix toward a floor of the food mix container; a port-sealing plate having a planar port-sealing surface connected to the float arm and pivotally mounted in sealing engagement with the food mix inlet port such that a change in level of food mix in the food mix container causes the port-sealing plate to pivot with respect to the port as an included angle between the elongated float arm and the floor of the food mix container changes with the change in food mix level thereby changing a port area sealed by said port-sealing plate to maintain a constant flow of food mix into said freezer chamber as the food mix level changes in the food mix container, said channel means including two sealingly interconnectable channel portions comprising an upper mixing conduit disposed within the food mix container and a freezer chamber feed conduit having an upper enlarged portion disposed within the food mix container for interconnection to the mixing conduit, and an integral freezer feed conduit extending downwardly from the enlarged portion to form a continuous conduit from said mixing conduit to said freezer chamber.

2. The freezer apparatus of claim 1 wherein said food mix inlet port comprises a lower annular portion and an interconnected elongated portion, said elongated portion surrounded by said planar surface of said channel means.

3. The freezer apparatus of claim 2 wherein said elongated portion of said inlet port extends vertically upwardly from said lower annular port portion.

4. The apparatus of claim 1 wherein an inner diameter of the mixing conduit has a smaller diameter than an inner diameter of the freezer chamber feed conduit and an outer surface of the mixing conduit is adapted for sealing engagement with an inner surface of the freezer chamber feed conduit within said enlarged upper portion thereof for sealingly interconnecting the mixing conduit to the freezer chamber feed conduit.

5. The apparatus of claim 1 wherein the float arm is pivotally mounted to the enlarged upper portion of the freezer feed conduit within the food mix container adjacent to the food mix inlet port.

6. The apparatus of claim 5 wherein the float arm is pivotally mounted to said enlarged portion of the freezer feed conduit at an elongated pivot pin extending vertically outwardly from said port-sealing surface of said port-sealing plate.

7. The apparatus of claim 6 wherein said pivot pin includes a first annular portion extending from said port-sealing surface, a second, reduced-diameter intermediate portion extending outwardly from said first portion, and a third generally annular portion extending outwardly from said intermediate portion, to form a pair of annular guide walls surrounding the intermediate portion; and a post radially extending from an outer surface of the channel means adapted to seat adjacent the intermediate portion of the pivot pin adjacent the pair of annular guide walls for contact of the guide walls against said post to prevent longitudinal movement of the pivot pin with respect to the enlarged upper portion of the freezer feed conduit to maintain sealing alignment of the port-sealing surface with the planar surface surrounding said inlet port portion.

8. The apparatus of claim 7 wherein the third portion of the pivot pin includes a flattened exterior surface adapted for initially mounting the pivot pin to the enlarged upper portion of the freezer chamber feed conduit by sliding the flattened surface over the radially extending post and into an annular pivot aperture in the enlarged upper portion of the freezer chamber feed conduit.

9. The apparatus of claim 7 wherein the enlarged upper portion of the freezer chamber feed conduit includes a vertically disposed slot, defined by vertical interior walls, and an interior lower wall of the enlarged upper portion of the freezer feed conduit, said vertical interior walls including annular pivot pin-receiving apertures in horizontal alignment therein and wherein said radially extending post is adapted to fit within said slot in said enlarged portion of the freezer feed conduit with minimal clearance to seat against said lower slot wall, and wherein said pivot pin is adapted to be received within the aligned annular slots in said vertical interior walls, said post extending upwardly from said lower slot wall and extending to interfere with a lower portion of the aligned apertures so that initial assembly of the pivot pin within the aligned pivot pin-receiving apertures is possible only by initial rotational alignment of the flattened side of the third portion of the pivot pin with an upper surface of the radially extending post.

10. The apparatus of claim 9 wherein initial asembly of the pivot pin within said apertures is possible only by rotational alignment of the buoyant float member at a disposition below horizontal so that after assembly of the float means within the food mix container, the pivot pin cannot be removed.

11. The apparatus of claim 1 wherein said channel means includes air content adjusting means operatively connected to a lower portion thereof within the freezer chamber for adjusting an amount of air fed to the freezer chamber by vertical adjustment of an uppermost point of fluid communication between the freezer chamber and the channel means.

12. The apparatus of claim 11 wherein the air content adjusting means comprises two concentrically mounted conduits disposed at a lower end of the channel means, each conduit including an aperture extending to its lower end, one of said conduits rotatably mounted with respect to the other for alignment of the apertures in a predetermined disposition, one to the other, to provide a desired and adjustable uppermost point of fluid communication between the two conduits.

13. The apparatus of claim 9 wherein the apertures in the concentrically mounted conduits are identically formed inverted V-shaped apertures.

14. The apparatus of claim 1 wherein the float means includes an integral arcuate cam arm operatively connected thereto and wherein the food mix container includes an elongated level-indicating member vertically moveable within the food mix container and having an upper end disposed to extend above a cover of the food mix container and having a lower end extending downwardly into the food mix to contact an upper surface of the cam arm, such that when the cam arm pivots with downward movement of the float member, the lower end of the elongated level-indicating member contacts the cam arm at a vertically lower position, thereby lowering the upper end of the level-indicating member to decrease the extent that the level-indicating member extends above the food mix container cover.

15. Freezer apparatus for dispensing ice cream or other food ice mix comprising a food mix container supported above a freezer chamber for retaining a level of food mix; a freezer chamber operable to dispense frozen or partially frozen food materials to a consumer; channel-means for providing a fluid connection between the food mix container and the freezer chamber, said channel means having an open lower end extending below a level of food mix in the freezer chamber and including a food mix inlet port extending from said food mix container to within the channel, said inlet port disposed within a lower portion of the food mix container for admitting food mix from said food mix container through said port and into the freezer chamber, said channel means including an open upper end extending above a level of food mix in the food mix container for receiving air from above the food mix and directing said air, together with said food mix flowing through said port, into the freezer chamber when said food mix is dispensed from the freezer chamber, said air and food mix flowing into the freezer chamber automatically, in replacement amounts, when food mix is dispensed to said consumer from the freezer chamber, as a result of pressure balancing between the food mix container and the freezer chamber, said channel means further including an interior valve seat disposed above a float valve member, said valve seat disposed within the channel means between said inlet port and said freezer chamber, said valve seat adapted to receive said float valve member to seal the channel means against reverse flow of food mix from the freezer chamber to said food mix container by floatation of said float valve on said food mix to seat the valve member within said valve seat when said food mix is not flowing from said food mix container into said freezer chamber, and a stop member being mounted to said channel means below the float valve to retain the float valve within the channel means during flow of food materials into the freezer chamber.

16. The apparatus of claim 9 wherein the channel means comprises an upper channel means portion of smaller internal diameter disposed within the food mix container and a lower channel means portion of larger internal diameter disposed within the freezer chamber in fluid communication therewith, said valve seat defined on a lowermost end of said upper channel means portion.

17. The apparatus of claim 15 wherein said channel means includes air content adjusting means operatively connected to a lower portion thereof within the freezer chamber for adjusting an amount of air fed to the freezer chamber by vertical adjustment of a lowermost point of fluid communication between the freezer chamber and the channel means.

18. The apparatus of claim 17 wherein the air content adjusting means comprises two concentrically mounted conduits disposed at a lower end of the channel means, each conduit including an aperture extending to its lower end, one of said conduits rotatably mounted with respect to the other for alignment of the apertures in a predetermined disposition, one to the other, to provide a desired and adjustable lowermost point of fluid communication between the two conduits.

19. Freezer apparatus for dispensing ice cream or other food ice materials comprising a food mix container supported above a freezer chamber for retaining a level of food mix; a freezer chamber operable to dispense frozen or partially frozen food materials to a consumer; channel-means for providing a fluid connection between the food mix container and the freezer chamber, said channel means having an open lower end extending below a level of food mix in the freezer chamber and including a food mix inlet port extending to within the channel said inlet port disposed within a lower portion of the food mix container for admitting a food mix from said food mix container through said port and into the freezer chamber, said channel means including an open upper end extending above a level of food mix in the food mix container for receiving air from above the food mix and directing said air, together with said food mix flowing through said port, into the freezer chamber, said air and food mix flowing into the freezer chamber automatically in replacement amounts, when food mix is dispensed to said consumer from the freezer chamber, as a result of pressure balancing between the food mix container and the freezer chamber; a float means disposed within the food mix container including a buoyant float member adapted to extend above an upper surface of food mix within the food mix container and an integral elongated float arm extending downwardly from the float member within the food mix toward a floor of the food mix container said float arm pivotally mounted within said food mix container such that change in level of food mix in the food mix container causes the float arm to pivot downwardly toward the floor of the food mix container; an elongated level-indicating member vertically movable within the food mix container and having an upper end disposed to extend above a cover of the food mix container and having a lower end extending downwardly into the food mix to contact a curved cam arm operatively connected to the elongated float arm such that when the float arm pivots downwardly, the lower end of the level-indicating member contacts the cam arm at a vertically lower position, thereby lowering the upper end of the level-indicating member to decrease the extent that the level-indicating member extends above the food mix container cover, said food mix inlet port comprising a lower annular portion and an interconnected elongated portion, said elongated portion surrounded by a planar surface of said channel means.

20. The freezer apparatus of claim 19 wherein said elongated portion of said inlet port extends vertically upwardly from said lower annular port portion.

21. The appartus of claim 19 wherein said channel means includes two sealingly interconnectable channel portions comprising an upper mixing conduit disposed within the food mix container and a freezer chamber feed conduit having an upper enlarged portion disposed within the food mix container for interconnection to the mixing conduit, and an integral freezer feed conduit extending downwardly from the enlarged portion to form a continuous freezer chamber feed conduit from said mixing conduit to said freezer chamber.

22. The apparatus of claim 19 wherein an inner diameter of the mixing conduit has a smaller diameter than an inner diameter of the freezer chamber feed conduit and an outer surface of the mixing conduit is adapted for sealing engagement with an inner surface of the freezer feed conduit within said enlarged upper portion thereof for sealingly interconnecting the mixing conduit to the freezer feed conduit.

23. The apparatus of claim 21 wherein the float arm is pivotally mounted to the enlarged upper portion of the freezer feed conduit within the food mix container adjacent to the food mix inlet port.

24. The apparatus of claim 23 wherein the float arm is pivotally mounted to said enlarged portion of the freezer feed conduit at an elongated pivot pin extending vertically outwardly from a port-sealing surface of a port-sealing plate operatively connected to said float arm.

25. The apparatus of claim 24 wherein said pivot pin includes a first annular portion extending from said port-sealing surface, a second, reduced-diameter intermediate portion extending outwardly from said first portion, and a third generally annular portion extending outwardly from said intermediate portion, to form a pair of annular guide walls surrounding the intermediate portion; and a post radially extending from an outer surface of the channel means adapted to seat adjacent the intermediate portion of the pivot pin adjacent the pair of annular guide walls for contact of the guide walls against said post to prevent longitudinal movement of the pivot pin with respect to the enlarged upper portion of the freezer feed conduit to maintain sealing alignment of the port-sealing surface with the planar surface surrounding said inlet port portion.

26. The apparatus of claim 25 wherein the third portion of the pivot pin includes a flattened surface adapted for initially mounting the pivot pin to the enlarged upper portion of the freezer chamber feed conduit by sliding the flattened surface over the radially extending post and into an annular pivot aperture in the enlarged upper portion of the freezer chamber feed conduit.

27. The apparatus of claim 26 wherein the enlarged upper portion of the freezer chamber feed conduit includes a vertically disposed slot, defined by vertical interior walls, and an interior lower wall of the enlarged upper portion of the freezer chamber feed conduit, said vertical interior walls including annular pivot pin-receiving apertures in horizontal alignment therein and wherein said radially extending post is adapted to fit within said slot in said enlarged portion of the freezer chamber feed conduit with minimal clearance to seat against said lower slot wall, and wherein said pivot pin is adapted to be received within the aligned annular slots in said vertical interior walls, said post extending upwardly from said lower slot wall and extending to interfere with a lower portion of the aligned apertures so that initial assembly of the pivot pin within the aligned pivot pin-receiving apertures is possible only by initial rotational alignment of the flattened side of the third portion of the pivot pin with an upper surface of the radially extending post.

28. The apparatus of claim 27 wherein initial asembly of the pivot pin within said apertures, with the channel means vertical, is possible only by rotational alignment of the buoyant float member at a disposition below horizontal so that after assembly of the float means within the food mix container, the pivot pin cannot be removed.

29. The apparatus of claim 19 wherein said channel means includes air content adjusting means operatively connected to a lower portion thereof within the freezer chamber for adjusting an amount of air fed to the freezer chamber by vertical adjustment of a lowermost point of fluid communication between the freezer chamber and the channel means.

30. The apparatus of claim 29 wherein the air content adjusting means comprises two concentrically mounted conduits disposed at a lower end of the channel means, each conduit including an aperture extending to its lower end, one of said conduits rotatably mounted with respect to the other for alignment of the apertures in a predetermined disposition, one to the other, to provide a desired and adjustable lowermost point of fluid communication between the two conduits.

31. Freezer apparatus for dispensing ice cream or other food ice materials comprising a food mix container supported above a freezer chamber for retaining a level of food mix; a freezer chamber operable to dispense frozen or partially frozen food materials to a consumer; channel-means for providing a fluid connection between the food mix container and the freezer chamber, said channel means having an open lower end extending below a level of food mix in the freezer chamber and including a food mix inlet port extending to within the channel said inlet port disposed within a lower portion of the food mix container for admitting a food mix from said food mix container through said port and into the freezer chamber, said channel means including an open upper end extending above a level of food mix in the food mix container for receiving air from above the food mix and directing said air, together with said food mix flowing through said port, into the freezer chamber, said air and food mix flowing into the freezer chamber automatically in replacement amounts, when food mix is dispensed to said consumer from the freezer chamber, as a result of pressure balancing between the food mix container and the freezer chamber;

and air content adjusting means operatively connected to said channel means for adjusting the uppermost point of fluid communication between the freezer chamber and the channel means to adjust the ratio of food mix to air entering the freezer chamber.

32. The apparatus of claim 31 wherein the air content adjusting means comprises two concentrically mounted conduits disposed at a lower end of the channel means, each conduit including an aperture extending to its lower end, one of said conduits rotatably mounted with respect to the other for alignment of the apertures in a predetermined disposition, one to the other, to provide a desired and adjustable uppermost point of fluid communication between the two conduits.

33. The apparatus of claim 32 wherein the apertures in the concentrically mounted conduits are identically formed inverted V-shaped apertures.

34. The freezer apparatus of claim 31 wherein the air content adjusting means comprises two concentrically mounted cylindrical conduits extending into the freezing chamber, said cylindrical conduits operatively connected for fluid sealing engagement, one within the other, and rotatable with respect to the other; each conduit having a notched port at its lower end such that rotation of one cylindrical conduit with respect to the other changes the uppermost point of fluid communication between the freezer chamber and an interior of the innermost conduit.

35. Freezer apparatus for dispensing ice cream or other food ice materials comprising a food mix container supported above a freezer chamber for retaining a level of food mix; a freezer chamber operable to dispense frozen or partially frozen food materials to a consumer; channel means for providing a fluid connection between the food mix container and the freezer chamber, said channel means having an open lower end extending below a level of food mix in the freezer chamber and including a planar exterior surface surrounding a food mix inlet port portion from the planar surface extending to within the channel and defined by walls of the planar surface, said inlet port disposed within a lower portion of the food mix container for admitting a predetermined constant flow rate of food mix from said food mix container through said port and into the freezer chamber, said channel means including an open upper end extending above a level of food mix in the food mix container for receiving air from above the food mix and directing said air, together with said food mix flowing through said port, into the freezer chamber, said air and food mix flowing into the freezer chamber automatically, in replacement amounts, when food mix is dispensed to said consumer from the freezer chamber, as a result of pressure balancing between the food mix container and the freezer chamber; a float means disposed within the food mix container including a buoyant float member adapted to extend above an upper surface of the food mix within the food mix container and an integral elongated float arm extending downwardly from the float member within the food mix toward a floor of the food mix container; a pivot pin operatively associated with said float arm and pivotally mounted at a lower portion of the food mix container, said pivot pin including a a first annular portion extending outwardly from said float means at a lower portion thereof, a second, reduced-diameter intermediate portion extending outwardly from said first portion, and a third generally annular portion extending outwardly from said intermediate portion, to form a pair of annular guide walls surrounding the intermediate pivot pin portion; and a post radially extending from an outer surface of the channel means adapted to seat under the intermediate portion of the pivot pin adjacent the pair of annular guide walls for contact of the guide walls against said post to prevent longitudinal movement of the pivot pin with respect to the channel means to maintain sealing alignment of the pivot pin with respect to the channel means.

36. The apparatus of claim 35 wherein the third portion of the pivot pin includes a flattened surface adapted for initially mounting the pivot pin to an enlarged portion of the channel means by sliding the flattened surface over the radially extending post and into an annular pivot aperture in the enlarged portion of the channel means.

37. Freezer apparatus for dispensing ice cream or other food ice mix comprising a food mix container supported above a freezer chamber for retaining a level of food mix; a freezer chamber operable to dispense frozen or partially frozen food materials to a consumer; channel-means for providing a fluid connection between the food mix container and the freezer chamber, said channel means having an open lower end extending below a level of food mix in the freezer chamber and including a food mix inlet port extending from said food mix container to within the channel, said inlet port disposed within a lower portion of the food mix container for admitting food mix from said food mix container through said port and into the freezer chamber, said channel means including an open upper end extending above a level of food mix in the food mix container for receiving air from above the food mix and directing said air, together with said food mix flowing through said port, into the freezer chamber when said food mix is dispensed from the freezer chamber, said air and food mix flowing into the freezer chamber automatically, in replacement amounts, when food mix is dispensed to said consumer from the freezer chamber, as a result of pressure balancing between the food mix container and the freezer chamber, said channel means further including an interior valve seat disposed above a float valve member, said valve seat disposed within the channel means between said inlet port and said freezer chamber, said valve seat adapted to receive said float valve member to seal the channel means against reverse flow of food mix from the freezer chamber to said food mix container by flotation of said float valve on said food mix to seat the valve member within said valve seat when said food mix is not flowing from said food mix container into said freezer chamber, said apparatus further including a float means disposed within the food mix container including a buoyant float member adapted to extend above an upper surface of the food mix within the food mix container and an integral elongated float arm extending downwardly from the float member within the food mix toward a floor of the food mix container; a port-sealing plate having a planar port-sealing surface operatively connected to the float arm and pivotally mounted in sealing engagement with the food mix inlet port such that a changing level of food mix in the food mix container causes the port-sealing plate to pivot with respect to the port as an included angle between the elongated float arm and the floor of the food mix container changes with the change in food mix level thereby changing a port area sealed by said port-sealing plate to maintain a constant flow of food mix into said freezer chamber as the food mix level changes in the food mix container, said food mix inlet port comprising a lower annular portion and an interconnected elongated portion, said elongated portion surrounded by a planar surface of said channel means.

38. The freezer apparatus of claim 37 wherein said elongated portion of said inlet port extends vertically upwardly from said lower annular port portion.

39. The apparatus of claim 37 wherein said channel means includes two sealingly interconnectable channel portions comprising an upper mixing conduit disposed within the food mix container and a freezer chamber feed conduit having an upper enlarged portion disposed within the food mix container for interconnection to the mixing conduit, and an integral freezer feed conduit extending downwardly from the enlarged portion to form a continuous freezer chamber feed conduit from said mixing conduit to said freezer chamber.

40. The apparatus of claim 37 wherein an inner diameter of the mixing conduit has a smaller diameter than an inner diameter of the freezer chamber feed conduit and an outer surface of the mixing conduit is adapted for sealing engagement with an inner surface of the freezer feed conduit for sealingly interconnecting the mixing conduit to the freezer feed conduit.

41. The apparatus of claim 39 wherein the float arm is pivotally mounted to the enlarged upper portion of the freezer feed conduit within the food mix container adjacent to the food mix inlet port.

42. The apparatus of claim 22 wherein the float arm is pivotally mounted to said enlarged portion of the freezer feed conduit at an elongated pivot pin extending vertically outwardly from said port-sealing surface of said port-sealing plate.

43. The apparatus of claim 42 wherein said pivot pin includes a first annular portion extending from said port-sealing surface, a second, reduced-diameter intermediate portion extending outwardly from said first portion, and a third generally annular portion extending outwardly from said intermediate portion, to form a pair of annular guide walls surrounding the intermediate portion; and a post radially extending from an outer surface of the channel means adapted to seat adjacent the intermediate portion of the pivot pin adjacent the pair of annular guide walls for contact of the guide walls against said post to prevent longitudinal movement of the pivot pin with respect to the enlarged upper portion of the freezer feed conduit to maintain sealing alignment of the port-sealing surface with the planar surface surrounding said inlet port portion.

44. The apparatus of claim 43 wherein the third portion of the pivot pin includes a flattened surface adapted for initially mounting the pivot pin to the enlarged upper portion of the freezer feed conduit by sliding the flattened surface over the radially extending post and into an annular pivot aperture in the enlarged upper portion of the freezer feed conduit.

45. The apparatus of claim 43 wherein the enlarged upper portion of the freezer feed conduit includes a vertically disposed slot, defined by vertical interior walls, and an interior lower wall of the enlarged upper portion of the freezer feed conduit, said vertical interior walls including annular pivot pin-receiving apertures in horizontal alignment therein and whrein said radially extending post is adapted to fit within said slot in said enlarged portion of the freezer conduit with minimal clearance to seat against said lower slot wall, and wherein said pivot pin is adapted to be received within the aligned annular slots in said vertical interior walls, said post extending upwardly from said lower slot wall and extending to interfere with a lower portion of the aligned apertures so that initial assembly of the pivot pin within the aligned pivot pin-receiving apertures is possible only by initial rotational alignment of the flattened side of the third portion of the pivot pin with an upper surface of the radially extending post.

46. The apparatus of claim 37 wherein the float means includes an integral acruate cam arm operatively connected thereto and wherein the food mix container includes an elongated level-indicating member vertically moveable within the food mix container and having an upper end disposed to extend above a cover of the food mix container and having a lower end extending downwardly into the food mix to contact an upper surface of the cam arm, such that when the cam arm pivots with downward movement of the float member, the lower end of the elongated level-indicating member contacts the cam arm at a vertically lower position, thereby lowering the upper end of the level-indicating member to decrease the extent that the level-indicating member extends above the food mix container cover.

* * * * *

UNITED STATES PATENT AND TRADEMARK OFFICE
CERTIFICATE OF CORRECTION

PATENT NO. : 4,617,802

DATED : October 21, 1986

INVENTOR(S) : Armin Fiedler

It is certified that error appears in the above–identified patent and that said Letters Patent are hereby corrected as shown below:

Col. 17, line 29, "22" should read --39--.

Signed and Sealed this

Fourteenth Day of April, 1987

Attest:

DONALD J. QUIGG

*Attesting Officer*      *Commissioner of Patents and Trademarks*